(12) United States Patent
Howard

(10) Patent No.: US 10,454,898 B2
(45) Date of Patent: Oct. 22, 2019

(54) METHOD OF SECURING CONNECTED DEVICES ON A NETWORK

(71) Applicant: VISA INTERNATIONAL SERVICE ASSOCIATION, San Francisco, CA (US)

(72) Inventor: Kelvan Howard, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 15/570,046

(22) PCT Filed: Apr. 25, 2016

(86) PCT No.: PCT/US2016/029190
§ 371 (c)(1),
(2) Date: Oct. 27, 2017

(87) PCT Pub. No.: WO2016/176142
PCT Pub. Date: Nov. 3, 2016

(65) Prior Publication Data
US 2018/0241722 A1    Aug. 23, 2018

Related U.S. Application Data

(60) Provisional application No. 62/155,299, filed on Apr. 30, 2015.

(51) Int. Cl.
*H04L 29/06*        (2006.01)
*G06F 15/16*        (2006.01)
(Continued)

(52) U.S. Cl.
CPC .......... *H04L 63/0414* (2013.01); *G06F 15/16* (2013.01); *G06F 21/6245* (2013.01);
(Continued)

(58) Field of Classification Search
CPC .................................................. H04L 63/0414
See application file for complete search history.

(56) References Cited

U.S. PATENT DOCUMENTS 5,649,102 A * 7/1997 Yamauchi ................. G06F 9/52
709/213
5,991,753 A * 11/1999 Wilde ...................... G06F 16/10
(Continued)

OTHER PUBLICATIONS

Zhang et al.; Anonymous communications in mobile ad hoc networks; Published in: Proceedings IEEE 24th Annual Joint Conference of the IEEE Computer and Communications Societies; Date of Conference: Mar. 13-17, 2005; IEEE Xplore (Year: 2005).*
(Continued)

*Primary Examiner* — Bradley W Holder
(74) *Attorney, Agent, or Firm* — Loeb & Loeb LLP

(57) ABSTRACT

A computing device and method may mask an identification of another computing device from malicious and unauthorized use of that identification for network communication. An identification for a network-based electronic device may be received, and a generic device ID may be created for the received ID. The received ID and the generic device ID may be stored in a memory as being related. The generic ID may be communicated by the masking device and method to an outside network.

17 Claims, 6 Drawing Sheets

(51) Int. Cl.
*G06Q 30/00* (2012.01)
*G06Q 50/18* (2012.01)
*G06Q 20/32* (2012.01)
*G06Q 20/38* (2012.01)
*G06F 21/62* (2013.01)
*H04W 12/02* (2009.01)

(52) U.S. Cl.
CPC ........... *G06Q 20/32* (2013.01); *G06Q 20/383* (2013.01); *G06Q 20/385* (2013.01); *G06Q 30/00* (2013.01); *G06Q 50/18* (2013.01); *H04L 63/0407* (2013.01); *H04L 63/0428* (2013.01); *H04W 12/02* (2013.01)

(56) References Cited

U.S. PATENT DOCUMENTS

| | | | | |
|---|---|---|---|---|
| 6,055,236 | A * | 4/2000 | Nessett | H04L 29/12009 370/389 |
| 6,549,972 | B1 * | 4/2003 | Berstis | H04L 63/02 710/311 |
| 6,742,034 | B1 * | 5/2004 | Schubert | G06F 3/0607 709/214 |
| 7,451,224 | B1 * | 11/2008 | Stamler | H04L 41/0846 709/228 |
| 8,897,739 | B1 * | 11/2014 | Mateski | H04W 4/90 455/404.1 |
| 2007/0073811 | A1 * | 3/2007 | Rubin | G06Q 20/383 709/205 |
| 2010/0057843 | A1 * | 3/2010 | Landsman | H04L 63/0407 709/203 |
| 2011/0196793 | A1 | 8/2011 | Zheng et al. | |
| 2012/0151026 | A1 | 6/2012 | Chen et al. | |
| 2014/0359782 | A1 | 12/2014 | Golic | |

OTHER PUBLICATIONS

Zhou et al.; A brief survey on anonymization techniques for privacy preserving publishing of social network data; Published in: ACM SIGKDD Explorations Newsletter; vol. 10 Issue 2, Dec. 2008; pp. 12-22; ACM Digital Library (Year: 2008).*
International Search Report and Written Opinion for International Patent Application No. PCT/US2016/029190, filed Apr. 25, 2016.

* cited by examiner

METHOD OF SECURING CONNECTED DEVICES ON A NETWORK

CROSS-REFERENCE TO RELATED APPLICATIONS

This application claims priority to and the benefit of International Patent Application No. PCT/US2016/029190, filed Apr. 25, 2016, entitled "METHOD OF SECURING CONNECTED DEVICES ON A NETWORK," which claims priority to, and the benefit of U.S. Provisional Patent Application Ser. No. 62/155,299, filed Apr. 30, 2015, entitled "METHOD OF SECURING CONNECTED DEVICES ON A NETWORK," the entire contents of which are incorporated herein by reference.

BACKGROUND

There are advantages to having devices connected to outside networks such as obtaining updates and reporting issues that may require maintenance. As more and more devices become connected to outside networks, more opportunities exist for hackers to obtain information about those devices. Hacker may use the data on the devices to determine affluence of households, wreak havoc with the devices, or to hack the devices to obtain personal information of the device owners.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

Disclosed is a cloaking device that masks the identification (IDs) of computer based devices. An identification for an electronic device may be received, and a generic device ID may be created and exchanged for the received ID. The received ID and the generic device ID may be stored in a memory as being related. The generic ID may be communicated by the cloaking device to an outside network.

In one embodiment, a computing device may mask an identification of a network-enabled device. The device may comprise an input/output circuit, a processor, and a memory. The processor may be in communication with the input/output circuit and the memory may be in communication with the processor. The memory may store a plurality of instructions that, when executed by the processor, cause the processor to perform various actions. For example, the processor may dynamically assign a unique generic ID to the network-enabled device based on an identification received at the input/output circuit from the network-enabled device. The processor may also relate the received identification and the unique generic ID to each other and store the related received identification and the unique generic ID. The processor may also cause the unique generic ID to be communicated outside the network-enabled device.

In another embodiment, a method may create a generic ID for a network-enabled computing device by performing a number of computer-implemented steps. For example, the method may receive an ID from the network-enabled device at an input/output circuit of a masking device and communicate the received ID to a processor of the masking device. The processor may be physically configured to dynamically assign a unique generic ID to the network-enabled computing device. Further, the method may store the received ID and the unique generic ID in a memory of the masking device as being related, and communicate, with the input/output circuit, the unique generic ID for the network-enabled device to one or more other network-enabled devices.

Figure 1:
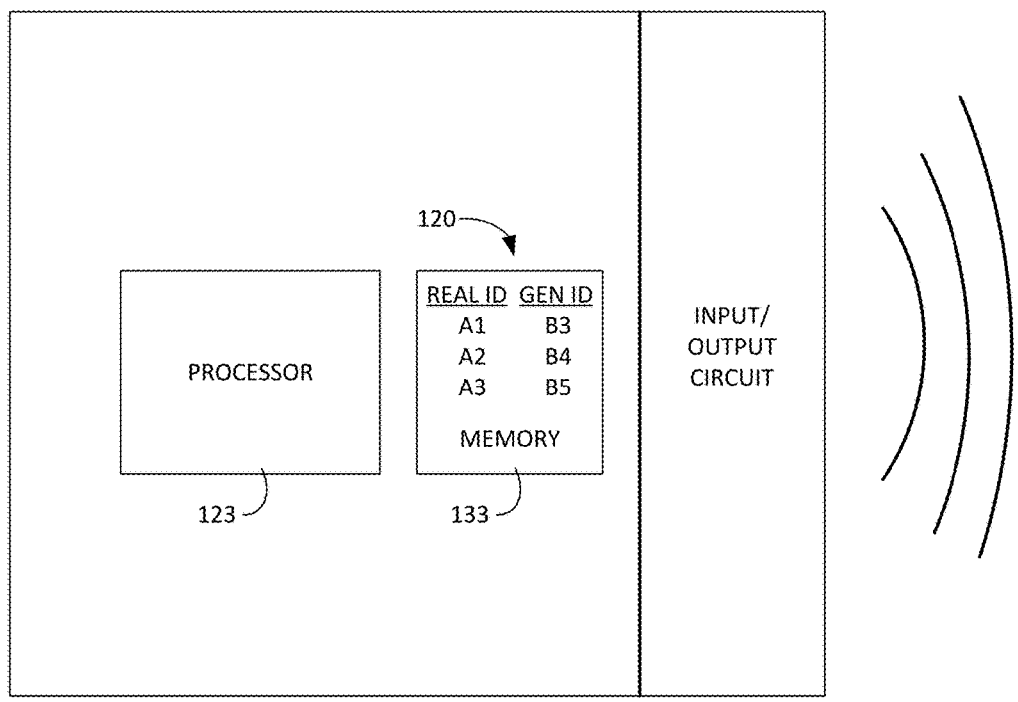
FIG. 1 is an illustration of some of the components of a masking device.

Elements in the figures are illustrated for simplicity and clarity. Not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

DETAILED DESCRIPTION

The various embodiments of the present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description is, therefore, not to be taken in a limiting sense.

At a high level, most computer-based, connected devices have an associated identification number. For example, a common identification number is a Unique Device Identifier (UDID) that may be thought of as a serial number burned into the device and that cannot be removed or changed.

Identification numbers may be exposed to application developers through an application program interface (API), without requiring the device owner's permission or knowledge. Malicious entities or "hackers" may be able to obtain the identification number such as the UDID and use the UDID in undesirable or unauthorized ways, such as determining the affluence of a property or gaining access to the connected devices to learn information about the device owners (e.g., hackers have accessed connected baby cams and home networks to monitor and harass individuals).

The disclosed masking device 103 and methods attempt to address the problems associated with unauthorized access and use of connected devices by masking the identification number of the device over the network. In use, a masked ID may prevent people who might hack into networks (such as WiFi networks) from knowing specifically what devices are present in a given household while still allowing the devices to have a valid IP address and device ID. The system may maximize user privacy and security, prevent hackers from detailing the types of devices in a household (which may correlate to the wealth of the household), may give consumers more control over the monitoring of their preferences and behavior, may allow connected devices to make purchases via the internet without revealing the number and type of devices in the household, and may protect user identification and payment information from hackers by ensuring device IDs cannot be associated with a user or the user's payment data. The masking device 103 disclosed herein addresses a problem that has only come into being since the advent of wide spread computers and networks.

Figure 2:
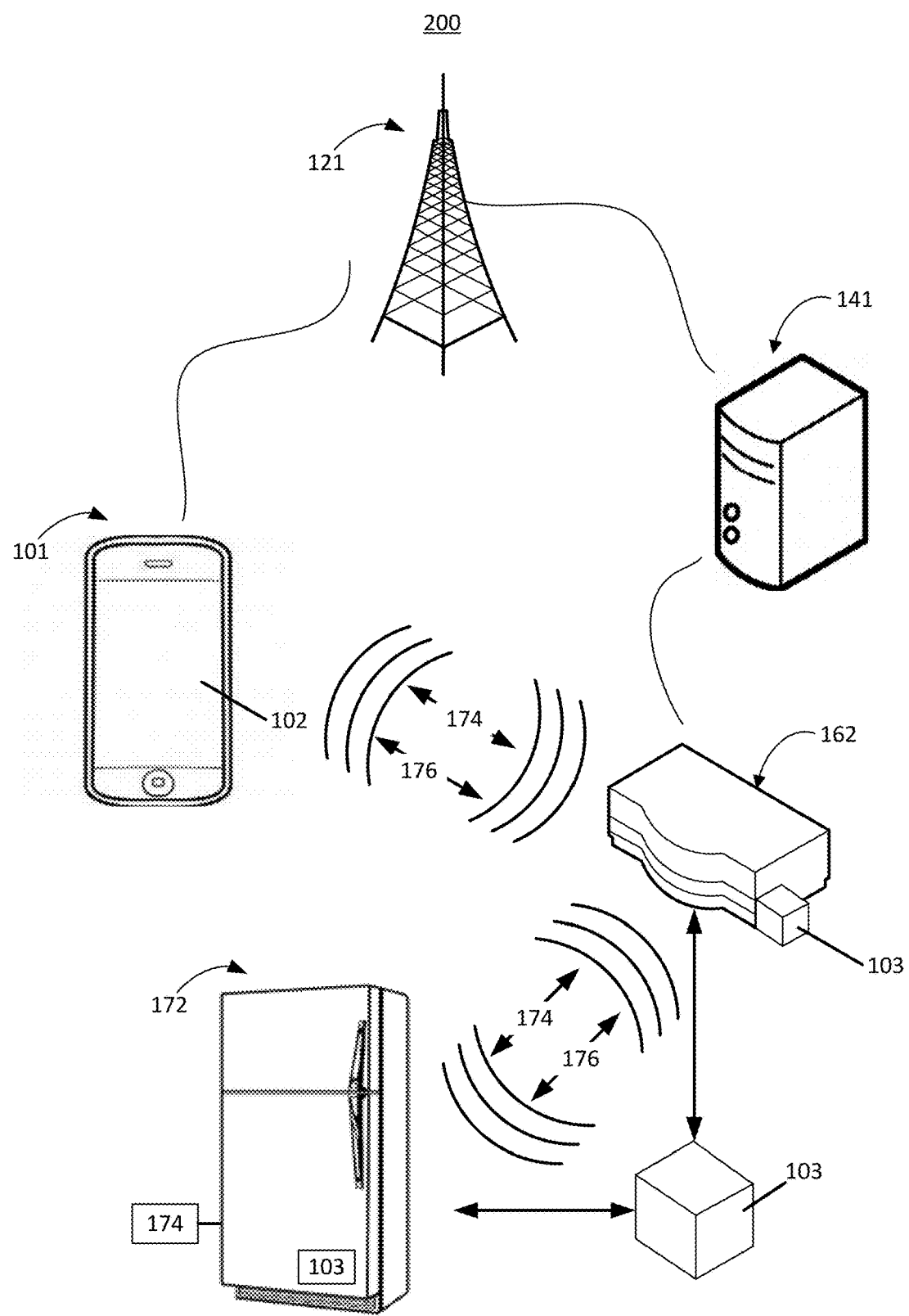
FIG. 2 is an illustration of a system for masking the identification of a network device.

Referring to FIG. 1, the masking device 103 may include a variety of elements to assist in masking identification numbers. An input-output circuit 113 may receive an ID from a device as illustrated in FIG. 2. The IDs may be received in a variety of ways. In some embodiments, computer based devices may periodically communicate or push their IDs. In other embodiments, the IDs may be provided in response to a query (pulled ID).

The ID may be received in a variety of ways depending on the embodiment and implementation details. In some embodiments, the masking device 103 may be a standalone masking device 103 that monitors network traffic which may be wired or wireless. In other embodiments, the masking device 103 may be part of a network device such as a router, firewall or network switch. In other embodiments, the masking device 103 may be part of an additional computing device.

As an example, an environment or system 200 (FIG. 2) may include several elements that, acting in concert, mask a network device identifier from other elements in the network. One example of a network device may be a refrigerator 172 that includes an identification number such as a UDID 174. The UDID 174 may be communicated wirelessly from the refrigerator 172 to a wireless router 162 where it may be communicated to a refrigerator manufacturer or it may be communicated in a wired manner through a wired router to the manufacturer. In some embodiments, the masking device 103 may be part of the refrigerator 172. In other embodiments, the masking device 103 may be part of the router 162. In use, the masking device 103 may mask the UDID of the refrigerator 172 unless permission from an authority is received to communicate the UDID.

Referring again to FIG. 2, where the masking device 103 may be part of the router 162, the received ID 174 from the refrigerator 172 may be received in either a wired or wireless manner. The device 103 may create a generic identification 176 and communicate that generic ID 176 while the received ID 174 and generic identification 176 may be stored as being related in a database in the router 162. Similarly, the various IDs from a smart phone 101 may be received including a UDID and the masking device 103 may determine which of the various received IDs from the smart phone 101 should be masked and which should be communicated. Logically, the masking device 103 may have its own algorithm for analyzing received ID or it may leverage the intelligence from one or more server type computer 141 through a network 121 which may provide a list of updated algorithms for reviewing the received IDs.

In yet another embodiment, the masking device 103 may be a separate, stand-alone masking device such as in FIG. 1 which is connected to the network either wirelessly or through wires. It may receive and mask the received IDs 174 before they are communicated to the outside, untrusted world. The input output circuit 113 may intercept network traffic such as HTTP traffic on a network and replace multiple device IDs on the network with a generated unique anonymized device ID 176. Similarly, a processor 123 may filter encrypted secure socket layer (SSL) data from one or more computing devices and replace the correct ID with a generated unique anonymized device ID 176. In some embodiments, the masking device 103 may receive a plurality of IDs such as UDIDs and may create a table 120 of IDs and generic IDs which are used to represent and track the devices broadcasting their UDIDs.

It also should be noted that computing devices 172 may have a plurality of IDs and masking the UDID 174 is just one of the IDs that may be masked. Some devices may have MAC addresses and a UDID and other devices may have additional identification and it may not be desirable to mask some of the identification indications. For example, in the case of some smart phones, a UDID may be distinct from the IMEI (international mobile equipment ID) which allows lock downs of stolen phones and the IMSI (international mobile subscriber ID) that is assigned by cellphone networks to a subscriber number. Anonymizing the UDID will not affect the ability to lock down the connected device in case of theft or the cellphone network's ability to identify the owner of the device.

In some embodiments, the masking device 103 may communicate an ID such as the UDID through the input-output device 113 to a processor 123. The processor 123 may be physically configured to dynamically assign a unique generic ID to the computing device 101. The assignment may occur in a variety of ways. In one embodiment, each computing device 101 with a UDID is given the same unique generic ID 176. In this embodiment, the same unique generic UDID is used to contact outside nodes or networks. Anyone hacking into the network will not be able to determine the specific pieces of equipment that are using the network.

In another embodiment, a unique generic ID such as a UDID is created for each of the electronic devices 101 and is stored in a memory 133 or database. The generic ID 176 may be created in a variety of ways. In one embodiment, the generic ID may be a series of random bytes that are placed in the desired format. For example, a MAC address may be in the format of 06-00-00-00-00-00 and thus the generic ID 176 may use a similar format and type of data such as MAC addresses. For example, a MAC address often includes hexadecimal digits and the generic ID 176 may also use hexadecimals.

In another embodiment, the generic ID may include some bits which represent a device manufacturer and additional random bits that provide no detail about the device. In this way, a manufacturer may recognize and accept a communication from a device even if the entire ID is not recognized. For example, two digits may indicate a refrigerator is made by Manufacturer A but the digits presenting a serial number may be masked or made random. As a result, Manufacturer A may receive (rather than reject) the communication from the refrigerator based the two correct digits.

In yet another embodiment, the processor may simulate a "factory reset" that assigns a generic ID 176 to the device. The factory reset may generate a generic ID automatically but the ID may be of the proper format and may be recognized by the manufacturer. The factory reset IDs for a variety of devices may be known and may be stored in the memory 133 of the masking device 103 and may be used as a generic ID.

Logically, if the masking device 103 is in communication with a plurality of electronic devices, each device may have its own unique ID such as a UDID 176. The generic ID may be created in different ways for different devices or different manufacturers.

The ID and the generic ID may be stored in a database in a memory 133 where the database may be queried in a variety of ways. As an example, a device manufacturer may wish to push an update to a device over a network such as the Internet. The manufacturer may communicate the specific generic ID for the device such that the update may reach the proper device. The masking device 103 may match the specific generic ID to a real ID using a database query on the database 133 and the update may be forwarded to the proper device using the true ID for the device.

Figure 3:
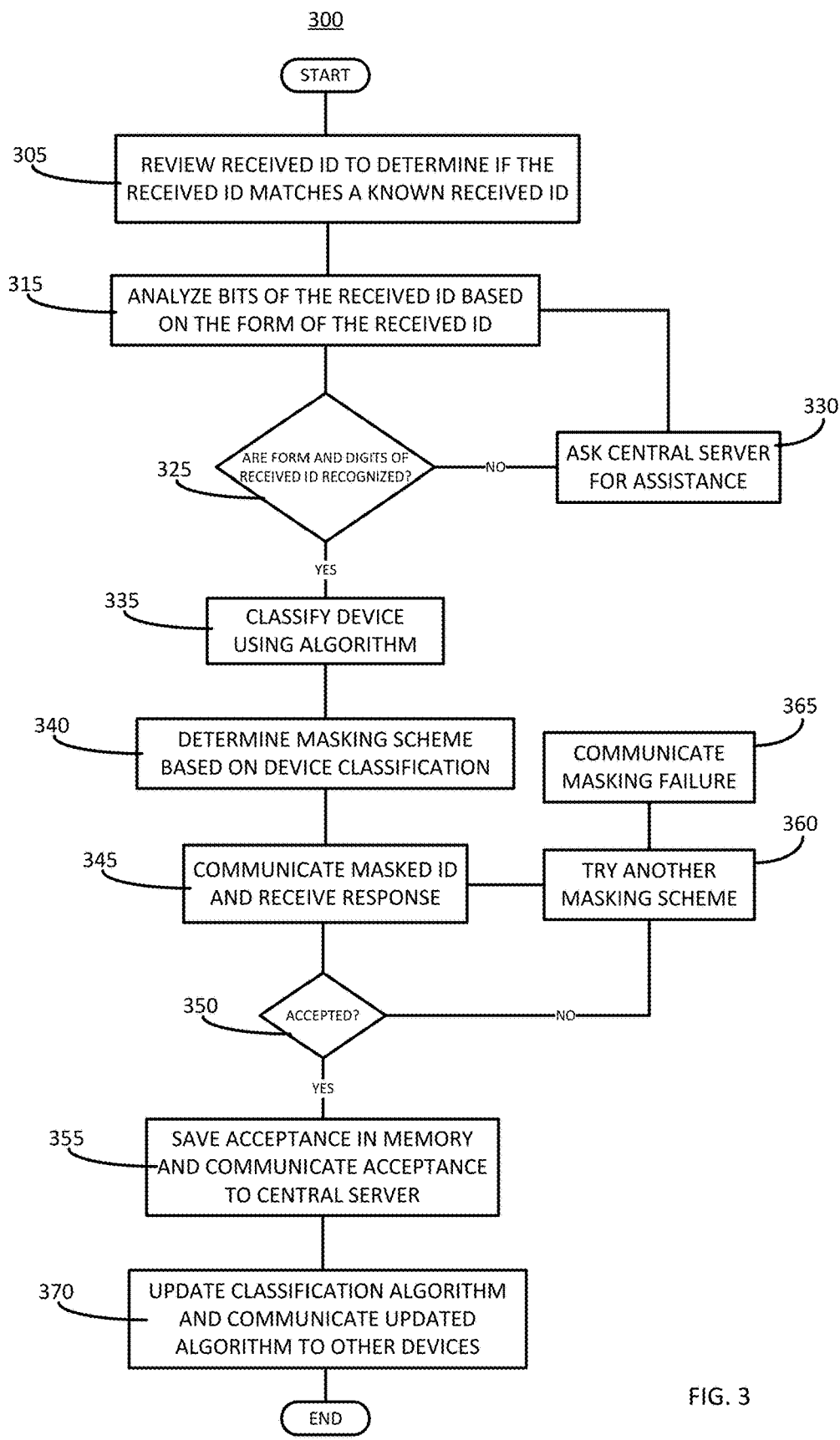
FIG. 3 is an illustration of a method in relation to the masking device and masking system.
Figure 4:
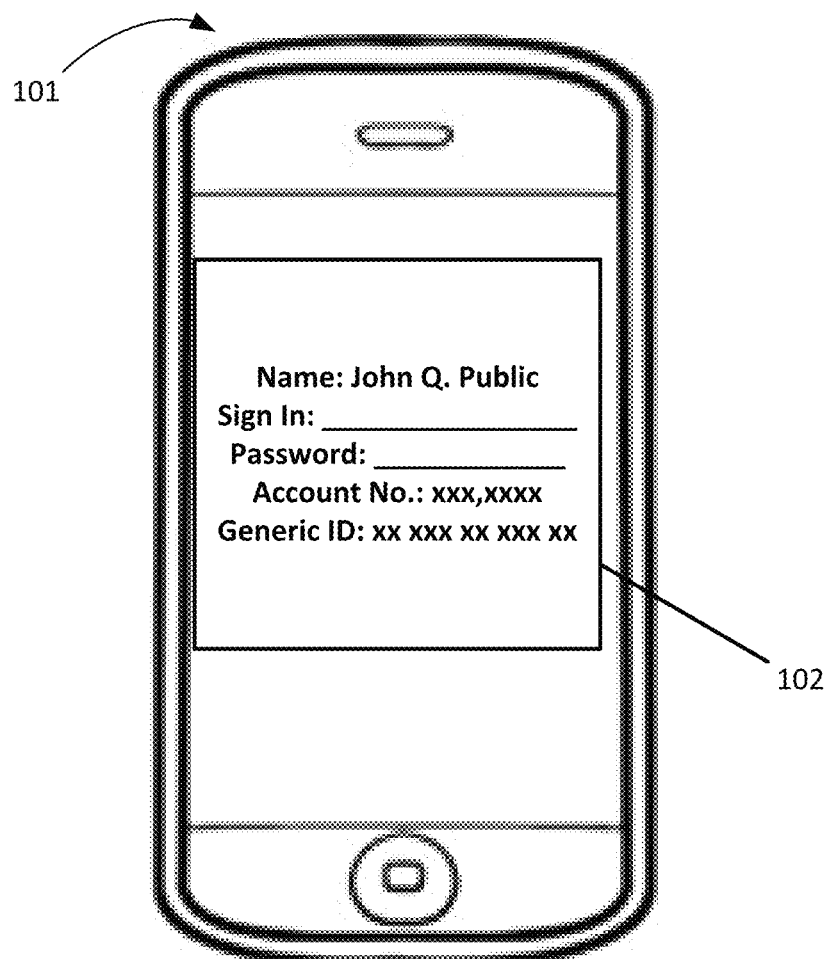
FIG. 4 is an illustration of a user interface for configuring the masking device and masking system.

The received IDs may be analyzed by an algorithm or set of rules to determine how the IDs should be treated. FIG. 3 may illustrate a method 300 including various function blocks that may be executed by a processor as a sample algorithm. Each various "block" described herein may correspond to one or more computer-executable instructions of one or more modules of the masking device 103 as executed on one or more processors such as processor 123. At block 305, the received ID may be reviewed to determine if the received ID matches a known received ID. For example, if the received ID has the form of an ID from an appliance, the algorithm may assume the device is an appliance.

At block 315, the bits of the received ID may be further analyzed in view of the form of the received ID. As the received ID may be in the form of an appliance, the bits may be compared to the bits of known appliance manufacturers. In this way, the probability of a proper match is more likely. At block 325, the method 300 may determine if the form and digits of the ID received at block 305 are recognized. For example, the received ID may be recognized as corresponding to an appliance or other electronic device. If the received ID is not recognized, then, at block 330, the device 103 may use a wired or wireless communication session to ask a central server 141 for assistance and return the method 300 to block 315.

If the method 300 recognizes the form and digits of the received ID, then, at block 335, the device may be classified by the algorithm. At block 340, the method 300 may determine the proper masking scheme for the ID. Some devices may require only the first two bits of a masked ID to be known to be properly accepted. In other embodiments, the first four bits may have to be known. The classification may determine the manner of the masking that may be used.

At block 345, the masked ID may be communicated and, in response to the communication, the method 300 may receive a response. At block 350, the method may use the response to determine whether the masked ID was accepted by the device that received the masked ID. If the response communication indicates that the masked ID was accepted, at block 355, the method 300 may note this acceptance in the memory 131 and communicate the acceptance to the central server 141 for future reference. If the method 300 determines that the masked ID was not accepted at block 350, then another form of masking may be tried at block 360 and the failure may be communicated to the central server or to the memory 131 at block 365. At block 370, the classification algorithm may be updated based on the response to the masked ID and the classification algorithm may be communicated to additional masking devices 103.

Logically, the input-output circuit in the masking device 103 may both receive and transmit data. On the receiving aspect, it may receive requests for identification information and diagnostic information, for example. In addition, the information requested may vary depending on the electronic device. A refrigerator 172 may not be very active in receiving or requesting information while a movable security camera may be very active in receiving or requesting information. When communicating data, either as an integral part of a device or as a stand-alone device, the masking device 103 may report the generic ID and the real ID may only be used internally. In situations where trust has been established or additional circumstance warrant, the actual ID may be provided.

In addition, the input-output circuit 113 may be adapted to receive a communication directed to the generic ID. The generic ID may be communicated to the memory or database where the generic ID may be matched to the real ID and the real ID may be used inside the processor 123 of the device 103. When reporting outside the processor 123, the ID may be converted back to the same unique generic ID or a different generic ID. In some embodiments, the unique generic ID is used inside and outside the processor 123 environment.

The masking device 103 may also insert a token for the user's payment information when transmitting payment data to further obfuscate the user and their financial information. For example, if a smart phone is being used for a purchase, payment data may be inserted in a token along with the generic ID. Of course, other data may be passed in and out of the masking device 103 as desired but the ID of the electronic device may be masked.

The masking device 103 may be configured in a variety of ways. In some embodiments, a user interface 102 (FIG. 2) may be resident on the masking device 103 and a user may be able to adjust settings on the masking device 103 such as whether all or part of the ID is made generic, whether certain domains are permitted to obtain the real ID, the status of the device, if a generic ID is being used, whether the generic ID was accepted, the received ID, the generic ID, etc. In additional embodiments, the masking device 103 may statically mask the received ID by communicating the generic ID for the life of the device, or may dynamically mask the received ID by altering the generic ID after a random or previously specified time interval. In other embodiments, the input-output circuit 113 may communicate a user interface to another computing device such as a smart phone or laptop where a user may adjust settings on the masking device such as illustrated in FIG. 3. For additional security, the user interface to control the masking device 103 may require a log in and a password to access the controls of the masking device 103. Further, the masking device 103 may keep records of requests for the ID, times the generic ID was used, the data that referenced the ID, etc. and such data may be used by consumers and manufacturers to determine if undesirable elements are attempting to reach products.

Figure 5:
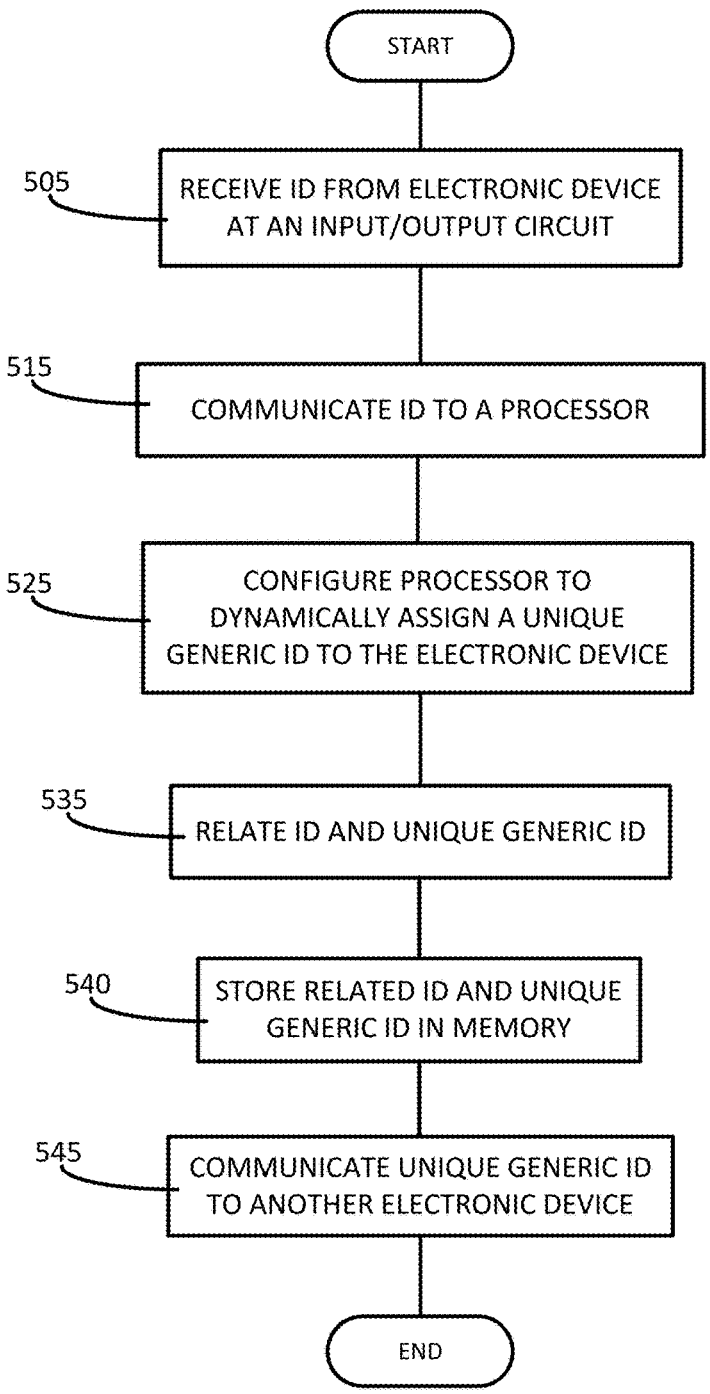
FIG. 5 is an illustration of a method in relation to the masking device and masking system.

The masking device 103 may execute a method 500 including various function blocks stored in memory and executed by a processor, as illustrated in FIG. 5. At block 505, an ID may be received from an electronic device at an input output circuit 113. At block 515, the method 500 may communicate the ID to a processor 123. At block 525, the processor 123 may be physically configured to dynamically assign a unique generic ID to the device 103. At block 535, the method may relate the ID and the unique generic ID together and, at block 540, may store the related ID and generic ID in a memory 133. And at block 545, the input-output circuit 113 may communicate the unique generic ID for the device 103 to an additional device.

As a result of the device 103, and methods described herein, users may be more secure. The advantages of having a device 103 connected to the internet may be available while the privacy desired by many users may also be available. In addition, the devices may still be able to receive desired messages such as maintenance updates.

Figure 6:
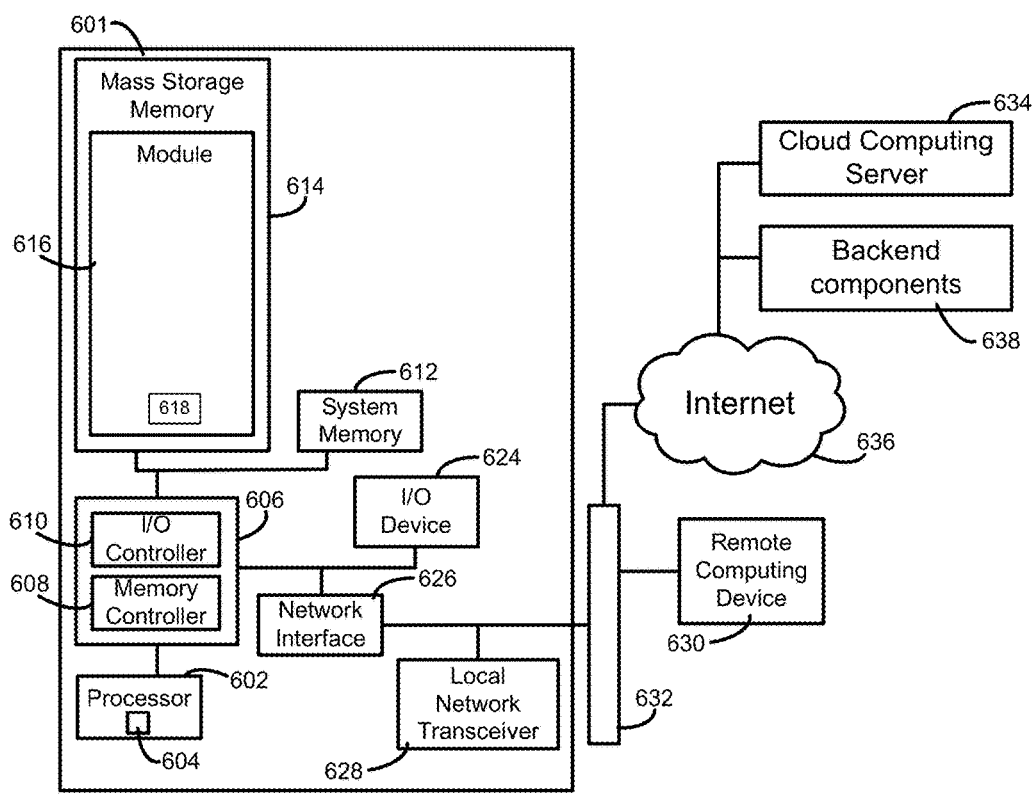
FIG. 6 is an illustration of a computing device that may be configured as described herein to mask the identification of a network device.

FIG. 6 is a high-level block diagram of an example computing environment 600 for the device and system for masking the identification of a network device as described herein. The computing device 601 may include a server (e.g., the masking device, the central server, the network device, the router, etc.), a mobile computing device (e.g., the smart phone), a Wi-Fi-enabled device or other personal computing device capable of wireless or wired communication, a thin client, or other known type of computing device. As will be recognized by one skilled in the art, in light of the disclosure and teachings herein, other types of computing devices can be used that have different architectures. Processor systems similar or identical to the example device and system for masking a network device may be used to implement and execute the example device of FIG. 1 and system of FIG. 2. Although the example system 600 is described below as including a plurality of peripherals, interfaces, chips, memories, etc., one or more of those elements may be omitted from other example processor systems used to implement and execute the example device or system for masking an identification of a network device. Also, other components may be added.

As shown in FIG. 6, the computing device 601 includes a processor 602 that is coupled to an interconnection bus. The processor 602 includes a register set or register space 604, which is depicted in FIG. 6 as being entirely on-chip, but which could alternatively be located entirely or partially off-chip and directly coupled to the processor 602 via dedicated electrical connections and/or via the interconnection bus. The processor 602 may be any suitable processor, processing unit or microprocessor. Although not shown in FIG. 6, the computing device 601 may be a multi-processor device and, thus, may include one or more additional processors that are identical or similar to the processor 602 and that are communicatively coupled to the interconnection bus.

The processor 602 of FIG. 6 is coupled to a chipset 606, which includes a memory controller 608 and a peripheral input/output (I/O) controller 610. As is well known, a chipset typically provides I/O and memory management functions as well as a plurality of general purpose and/or special purpose registers, timers, etc. that are accessible or used by one or more processors coupled to the chipset 606. The memory controller 608 performs functions that enable the processor 602 (or processors if there are multiple processors) to access a system memory 612 and a mass storage memory 614, that may include either or both of an in-memory cache (e.g., a cache within the memory 612) or an on-disk cache (e.g., a cache within the mass storage memory 614).

The system memory 612 may include any desired type of volatile and/or non-volatile memory such as, for example, static random access memory (SRAM), dynamic random access memory (DRAM), flash memory, read-only memory (ROM), etc. The mass storage memory 614 may include any desired type of mass storage device. For example, if the computing device 601 is used to implement a module 616 (e.g., the various modules to control a secondary account holder's use of a payment device and other modules as herein described). The mass storage memory 614 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 601, the masking device 103, and the system 200. Thus, a module, block, function, operation, procedure, routine, step, and method can be implemented in hardware, firmware, and/or software. In one embodiment, program modules and routines are stored in mass storage memory 614, loaded into system memory 612, and executed by a processor 602 or can be provided from computer program products that are stored in tangible computer-readable storage mediums (e.g. RAM, hard disk, optical/magnetic media, etc.).

The peripheral I/O controller 610 performs functions that enable the processor 602 to communicate with a peripheral input/output (I/O) device 624, a network interface 626, a local network transceiver 628, (via the network interface 626) via a peripheral I/O bus. The I/O device 624 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 624 may be used with the module 616, etc., to receive data from the transceiver 628, send the data to the backend components of the system 200, and perform any operations related to the methods as described herein. The local network transceiver 628 may include support for a Wi-Fi network, Bluetooth, Infrared, or other wireless data transmission protocols. In other embodiments, one element may simultaneously support each of the various wireless protocols employed by the computing device 601. For example, a software-defined radio may be able to support multiple protocols via downloadable instructions. In operation, the computing device 601 may be able to periodically poll for visible wireless network transmitters (both cellular and local network) on a periodic basis. Such polling may be possible even while normal wireless traffic is being supported on the computing device 601. The network interface 626 may be, for example, an Ethernet device, an asynchronous transfer mode (ATM) device, an 802.11 wireless interface device, a DSL modem, a cable modem, a cellular modem, etc., that enables the device 103 and/or system 200 to communicate with another computer system having at least the elements described in relation to the device 103/system 200.

While the memory controller 608 and the I/O controller 610 are depicted in FIG. 6 as separate functional blocks within the chipset 606, the functions performed by these blocks may be integrated within a single integrated circuit or may be implemented using two or more separate integrated circuits. The computing environment 600 may also implement the module 616 on a remote computing device 630. The remote computing device 630 may communicate with the computing device 601 over an Ethernet link 632. In some embodiments, the module 616 may be retrieved by the computing device 601 from a cloud computing server 634 via the Internet 636. When using the cloud computing server 634, the retrieved module 616 may be programmatically linked with the computing device 601. The module 616 may be a collection of various software platforms including artificial intelligence software and document creation software or may also be a Java® applet executing within a Java® Virtual Machine (JVM) environment resident in the computing device 601 or the remote computing device 630. The module 616 may also be a "plug-in" adapted to execute in a web-browser located on the computing devices 601 and 630. In some embodiments, the module 616 may communicate with back end components 638 such as the central server 141 of FIG. 1 via the Internet 636.

The system 600 may include but is not limited to any combination of a LAN, a MAN, a WAN, a mobile, a wired or wireless network, a private network, or a virtual private network. Moreover, while only one remote computing device 630 is illustrated in FIG. 6 to simplify and clarify the description, it is understood that any number of client computers are supported and can be in communication within the system 600.

The user devices, computers and servers described herein may be general purpose computers that may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS, UNIX, LINUX, MAC OS, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated. The attached Appendix may provide more detail regarding the operation of a payment system.

The present disclosure provides a solution to the long-felt need described above. In particular, the systems and methods described herein may be configured for improving payment systems. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

The invention claimed is:

1. A computing device to mask an identification of a network-enabled device comprising:
 an input/output circuit;
 a processor in communication with the input/output circuit;
 a memory in communication with the processor and storing a plurality of instructions that, when executed by the processor, cause the processor to:
 dynamically assign a unique generic identification to the network-enabled device based on an identification received at the input/output circuit from the network-enabled device;
 relate the received identification and the unique generic identification to each other;
 store the related received identification and the unique generic identification;
 cause the unique generic identification to be communicated outside the network-enabled device, and
 intercept a plurality of device identifications from HyperText Transfer Protocol traffic on a network and replace each of the plurality of device identifications with a unique generic device identification.

2. The computing device of claim 1, wherein the received identification is a Unique Device Identifier (UDID).

3. The computing device of claim 2, wherein the generic identification is in the form of a Unique Device Identifier.

4. The computing device of claim 2, wherein the memory includes further instructions that, when executed by the processor cause the input/output circuit to communicate with a plurality of electronic devices each with a unique Unique Device Identifier.

5. The computing device of claim 4, wherein the memory includes further instructions that, when executed by the processor, cause the received identification and the unique generic identification for each of the electronic devices to be stored in a database.

6. The computing device of claim 1, wherein the memory includes further instructions that, when executed by the processor, cause the input/output circuit to:
 (a) receive a communication directed to the generic identification,
 (b) communicate the generic identification to the memory, and
 (c) match the generic identification to the received identification to create a matched identification.

7. The computing device of claim 1, wherein the input/output circuit is further configured to communicate wirelessly.

8. The computing device of claim 1, wherein the input/output circuit is further configured to communicate additional identification data of the computing device.

9. The computing device of claim 1, wherein the input/output circuit, memory, and processor are integrated within a router.

10. The computing device of claim 9, wherein a single generic identification is used for a plurality of network devices.

11. The computing device of claim 1, wherein the generic identification comprises a plurality of random bytes.

12. The computing device of claim 1, wherein the generic identification comprises bits which represent a device manufacturer and additional random bits.

13. The computing device of claim 1, wherein the memory includes further instructions that, when executed by the processor cause the processor to simulate a factory reset process to assign a generic identification to the network-enabled device.

14. The computing device of claim 1, wherein the memory includes further instructions that, when executed by the processor, cause the processor to filter encrypted secure socket layer data from one or more computing devices and replace a received Unique Device Identifier with a generic identification.

15. A method of creating a generic identification for a network-enabled computing device comprising:
 (a) receiving an identification from the network-enabled device at an input/output circuit of a masking device;
 (b) communicating the received identification to a processor of the masking device where the processor is physically configured to dynamically assign a unique generic identification to the network-enabled computing device;
 (c) storing the received identification and the unique generic identification in a memory of the masking device as being related;
 (d) communicating, with the input/output circuit, the unique generic identification for the network-enabled device to one or more other network-enabled devices, and
 (e) intercepting, at the input/output circuit, a plurality of device identifications from HyperText Transfer Protocol traffic on a network and replacing each of the plurality of device identifications with a unique generic device identification.

16. The method claim 15, further comprising simulating a factory reset process to assign a generic identification to the network-enabled device.

17. The method of claim 15, further comprising filtering encrypted secure socket layer data from one or more computing devices and replacing a Unique Device Identifier from the encrypted secure socket layer data with a generic identification.

* * * * *